(12) United States Patent
Tanner et al.

(10) Patent No.: US 11,457,619 B2
(45) Date of Patent: Oct. 4, 2022

(54) FISHING ROD HOLDER ALERT APPARATUS

(71) Applicants: Lawrence Tanner, Greensboro, NC (US); Todd Tanner, Greensboro, NC (US)

(72) Inventors: Lawrence Tanner, Greensboro, NC (US); Todd Tanner, Greensboro, NC (US)

( * ) Notice: Subject to any disclaimer, the term of this patent is extended or adjusted under 35 U.S.C. 154(b) by 239 days.

(21) Appl. No.: 16/855,107

(22) Filed: Apr. 22, 2020

(65) Prior Publication Data
US 2021/0329899 A1    Oct. 28, 2021

(51) Int. Cl.
*A01K 97/12* (2006.01)
*A01K 97/10* (2006.01)
*A01K 97/01* (2006.01)

(52) U.S. Cl.
CPC ............ *A01K 97/125* (2013.01); *A01K 97/01* (2013.01); *A01K 97/10* (2013.01)

(58) Field of Classification Search
CPC ...... A01K 97/125; A01K 97/12; A01K 97/10; A01K 97/01
USPC ............................................. 43/17, 21.2, 4
See application file for complete search history.

(56) References Cited

U.S. PATENT DOCUMENTS

| | | | | |
|---|---|---|---|---|
| 4,213,264 A * | 7/1980 | Robinson, Jr. | ......... | A01K 97/00 43/16 |
| 4,506,257 A * | 3/1985 | Roberts, Sr. | ......... | A01K 97/125 340/573.2 |
| 4,852,290 A * | 8/1989 | Wallace | .................. | A01K 97/10 43/17 |
| D336,507 S | 6/1993 | Werner | | |
| 5,867,931 A * | 2/1999 | Morris | .................. | A01K 97/125 43/25 |
| 5,867,933 A * | 2/1999 | Walker | .................... | A01K 91/08 43/17 |
| 5,881,488 A * | 3/1999 | Canepa | ................ | A01K 97/125 43/4.5 |
| 5,979,101 A | 11/1999 | Muenchow | | |
| 5,986,552 A * | 11/1999 | Lyons | .................. | A01K 97/125 340/573.2 |
| 6,101,757 A * | 8/2000 | Draghici | .............. | A01K 97/125 43/17 |
| 6,119,389 A * | 9/2000 | Walker | .................... | A01K 91/08 43/17 |
| 6,170,189 B1 * | 1/2001 | Klein | ...................... | A01K 97/01 43/17 |

(Continued)

*Primary Examiner* — Darren W Ark
*Assistant Examiner* — Kevin M Dennis

(57) ABSTRACT

A fishing rod holder alert apparatus for improved ice fishing includes a housing, a rod aperture configured to hold the handle of a fishing rod, and a pivot rod. The pivot arm moves between a side position and an alternate front position. A swing arm moves between an engaged position and an alternate released position and has a line slot configured to secure a fishing line. A plurality of magnets is coupled to the pivot arm. A ferrous strip is coupled to the swing arm and is selectively engageable with the plurality of magnets to secure the swing arm in the engaged position until pulled by the fishing line, tripping a switch sensor to activate a buzzer. A logic module and a battery are coupled to the housing. The battery is in operational communication with the switch sensor, the buzzer, and the logic module.

10 Claims, 4 Drawing Sheets

(56) References Cited

U.S. PATENT DOCUMENTS

| | | | |
|---|---|---|---|
| 6,195,928 B1 * | 3/2001 | Nachtsheim | A01K 97/125 43/4.5 |
| 6,293,043 B1 * | 9/2001 | Zwettler | A01K 97/125 43/17 |
| 6,408,561 B1 * | 6/2002 | Winter | A01K 97/125 43/17 |
| 6,463,691 B1 * | 10/2002 | Atkins | A01K 97/125 43/17 |
| 6,634,134 B1 * | 10/2003 | Nyquist | A01K 97/10 43/16 |
| 6,935,068 B2 * | 8/2005 | Shackelford | A01K 97/125 43/25 |
| 6,938,367 B2 * | 9/2005 | Cameron | A01K 97/125 43/17 |
| 7,032,343 B1 * | 4/2006 | Foss | A01K 97/01 43/17 |
| 7,337,578 B2 * | 3/2008 | Pieczynski | A01K 93/02 43/43.13 |
| 7,454,861 B1 * | 11/2008 | Keibler | A01K 97/125 43/17 |
| 7,624,531 B2 * | 12/2009 | Kirby | A01K 97/10 43/17 |
| 7,739,827 B2 * | 6/2010 | Keller | A01K 97/12 43/17 |
| 7,818,913 B1 * | 10/2010 | Hoglund | A01K 97/01 43/16 |
| 7,934,338 B2 * | 5/2011 | Hope | A01K 97/125 43/17 |
| 8,316,577 B2 * | 11/2012 | Hale | A01K 91/10 43/43.11 |
| 8,756,854 B1 * | 6/2014 | Michaels | A01K 97/01 43/17 |
| 8,832,989 B2 * | 9/2014 | Martinella | A01K 97/01 43/4.5 |
| 8,881,445 B2 * | 11/2014 | Nolt | A01K 97/01 43/17 |
| 9,167,806 B2 * | 10/2015 | Hondl | A01K 97/12 |
| 9,861,088 B1 * | 1/2018 | Fuchsius | A01K 97/08 |
| 9,894,891 B2 * | 2/2018 | Bryzek | A01K 97/12 |
| 10,412,943 B2 * | 9/2019 | Hartsock | A01K 89/081 |
| 2015/0208633 A1 | 7/2015 | Schramski | |

* cited by examiner

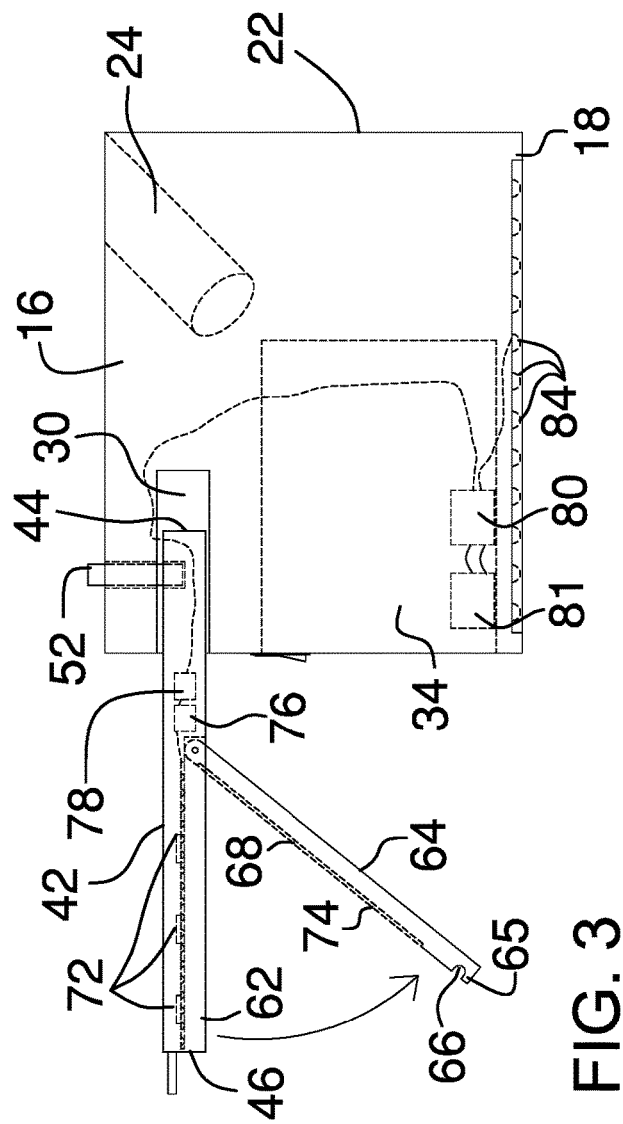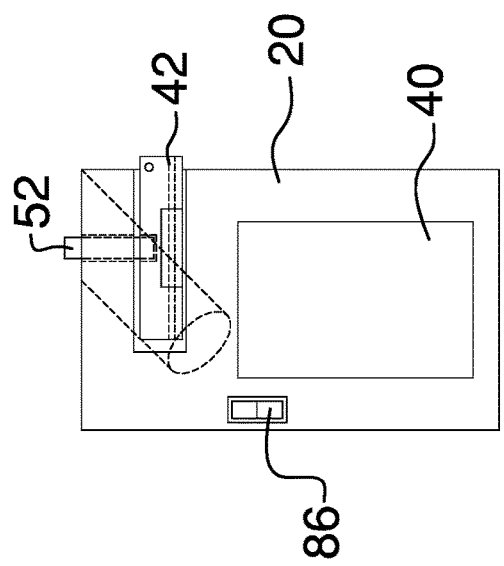

FISHING ROD HOLDER ALERT APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to fishing rod holders and more particularly pertains to a new fishing rod holder for improved ice fishing.

BRIEF SUMMARY OF THE INVENTION

An embodiment of the disclosure meets the needs presented above by generally comprising a housing having a housing front side, a housing back side, a housing top side, a housing bottom side, a housing left side, and a housing right side. The housing top side has a rod aperture extending through the housing back side. The rod aperture is configured to secure a handle of a fishing rod. The housing front side and the housing left side have a pivot slot extending through a front left edge of the housing. The housing left side has a housing cavity extending towards the housing right side. A pivot arm is coupled to the housing. The pivot arm has a proximal end pivotably coupled within the pivot slot, a distal end, an arm top side, and an arm bottom side. The pivot arm swingingly moves between a side position extending perpendicularly from the housing left side and an alternate front position extending perpendicularly from the housing front side. A swing arm is coupled to the arm bottom side to move between an engaged position adjacent the pivot arm and an alternate released position hanging below the pivot arm. An outer end of the swing arm extends past the distal end of the pivot arm. An upper side of the swing arm has a line slot adjacent the outer end, the line slot is configured to secure a fishing line of the fishing rod. A plurality of magnets is coupled to the arm bottom side. A ferrous strip is coupled to the swing arm. The ferrous strip is coupled to the upper side and is selectively engageable with the plurality of magnets to secure the swing arm in the engaged position. A switch sensor is coupled to the pivot arm and is in operational communication with the swing arm to detect movement from the engaged position to the released position. A buzzer is coupled to the pivot arm and is in operational communication with the switch sensor to create an audial alarm when the switch sensor is activated. A logic module is coupled to the housing within the housing cavity and is in operational communication with the switch sensor and the buzzer. A battery is coupled to the housing within the housing cavity and is in operational communication with the switch sensor, the buzzer, and the logic module.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 3 is a front elevation view of an embodiment of the disclosure.

FIG. 4 is a side elevation view of an embodiment of the disclosure.

DETAILED DESCRIPTION OF THE INVENTION

Figures 1, 2:
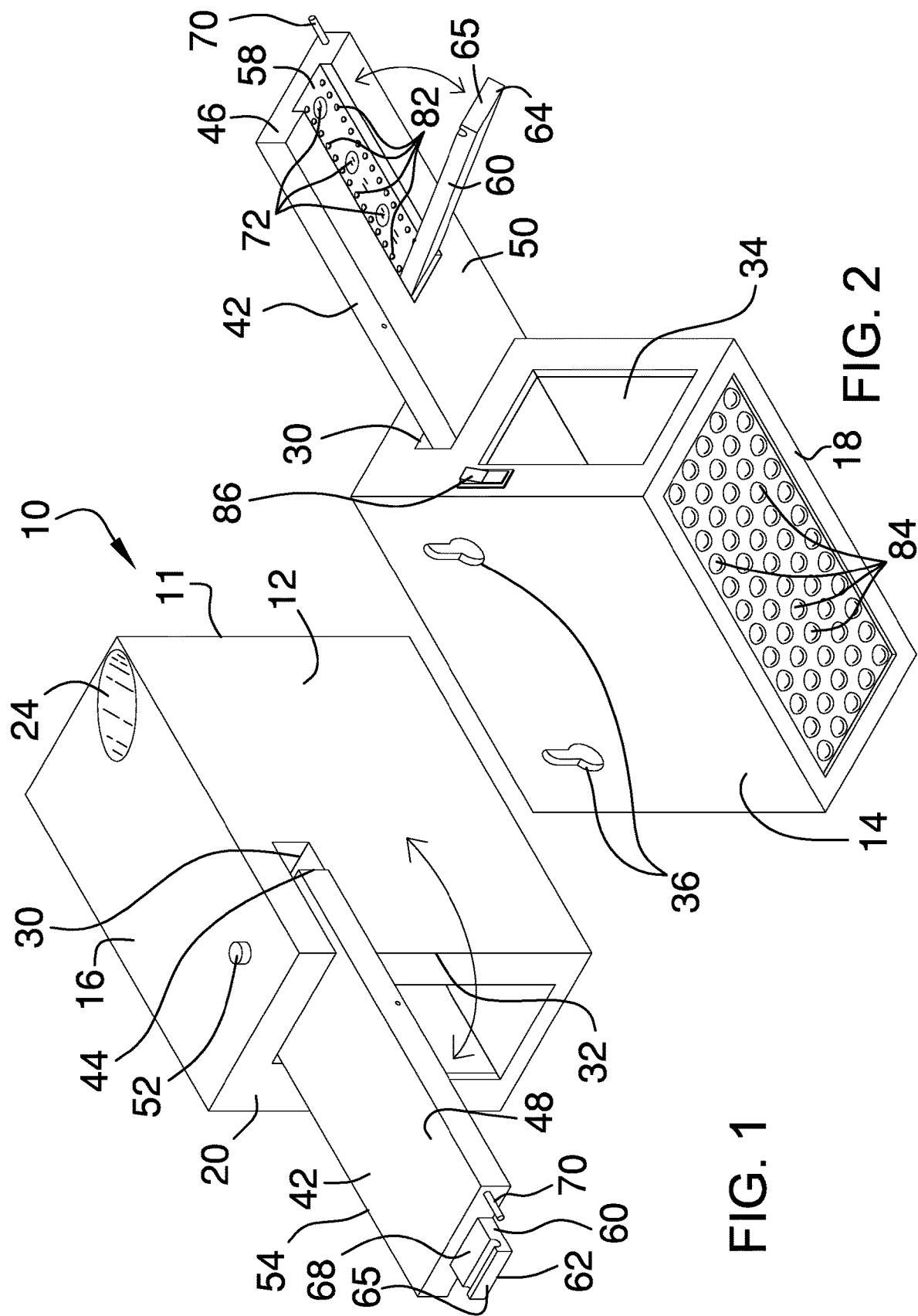
FIG. 1 is an isometric view of a fishing rod holder alert apparatus according to an embodiment of the disclosure.
FIG. 2 is an isometric view of an embodiment of the disclosure.
Figure 5:
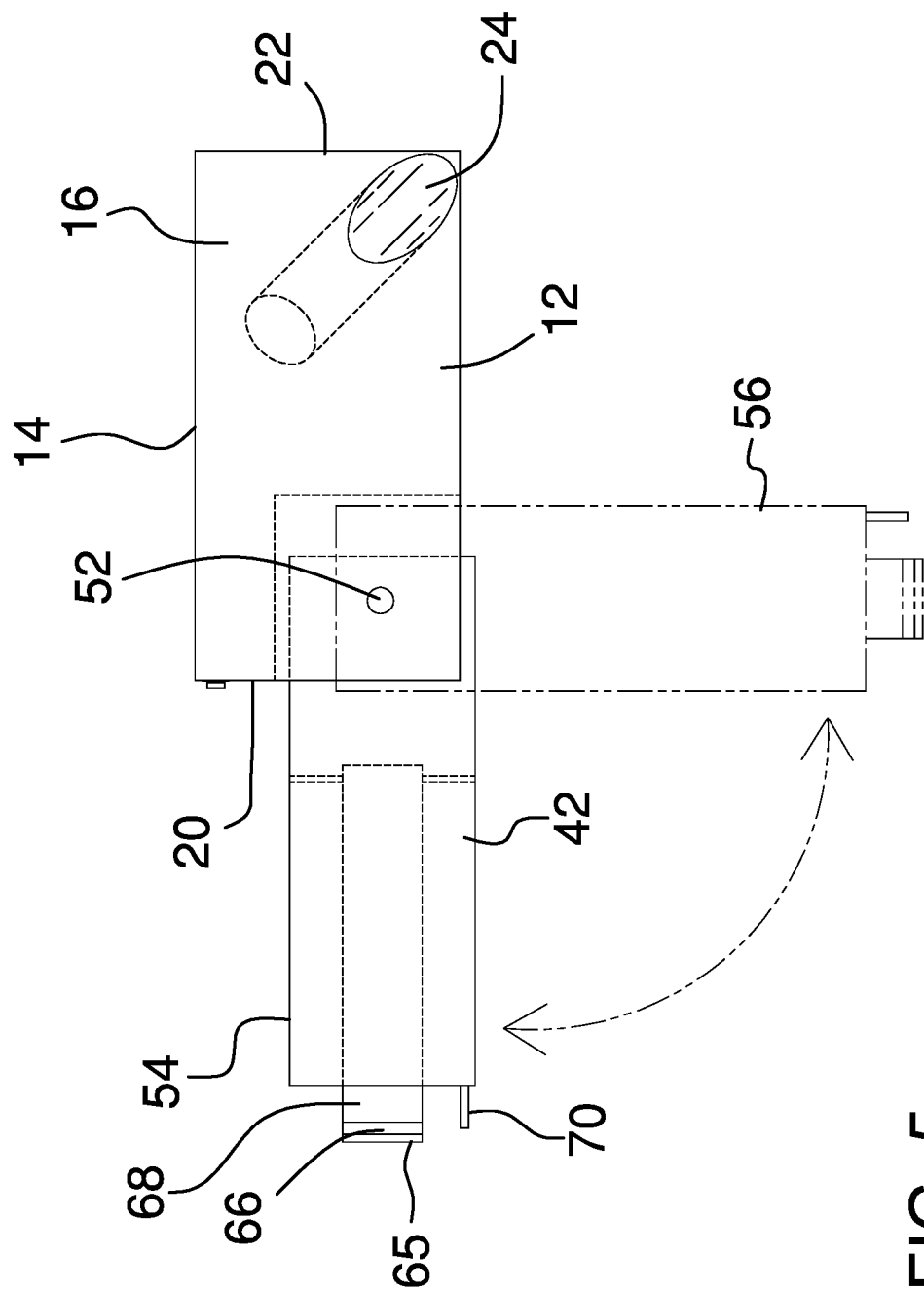
FIG. 5 is a top plan view of an embodiment of the disclosure.
Figure 6:
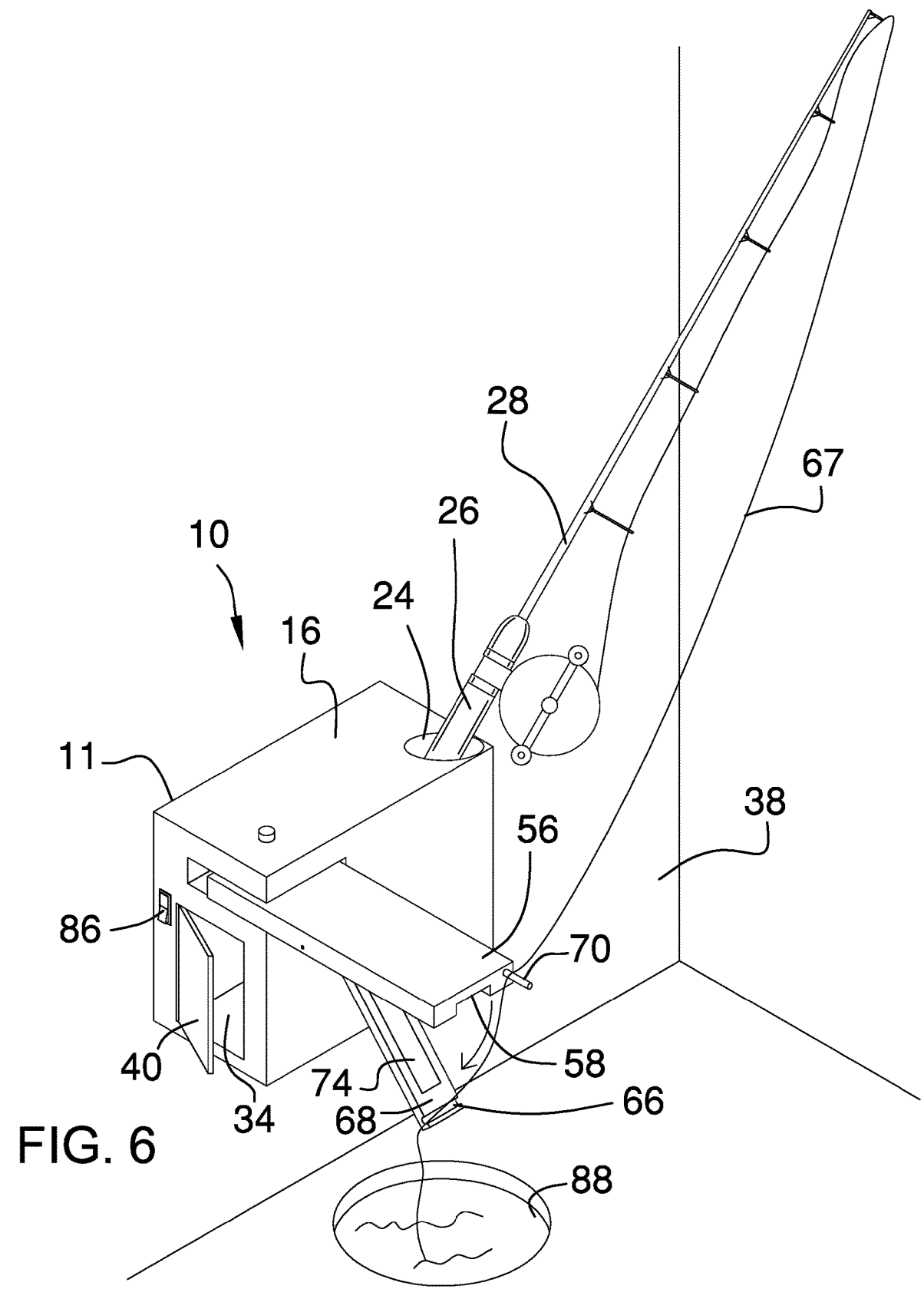
FIG. 6 is an in-use view of an embodiment of the disclosure.

With reference now to the drawings, and in particular to FIGS. 1 through 6 thereof, a new fishing rod holder embodying the principles and concepts of an embodiment of the disclosure and generally designated by the reference numeral 10 will be described.

As best illustrated in FIGS. 1 through 6, the fishing rod holder alert apparatus 10 generally comprises a housing 11 having a housing front side 12, a housing back side 14, a housing top side 16, a housing bottom side 18, a housing left side 20, and a housing right side 22. The housing top side 16 has a rod aperture 24 extending through the housing top side 16 at an angle of 45° relative to each of the housing top side 16 and the housing front side 12 and extending through the housing back side 14. The rod aperture 24 is configured to secure a handle 26 of a fishing rod 28. The housing front side 12 and the housing left side 20 have a pivot slot 30 extending through a front left edge 32 of the housing 11. The housing left side 20 has a housing cavity 34 extending towards the housing right side 22. The housing back side 14 has a pair of mounting apertures 36. The pair of mounting apertures 36 is configured to receive hardware to mount the housing 11 to a wall 38 of an ice fishing house. A cover 40 is coupled to the housing 11 and is selectively engageable with the housing left side 20 to cover and alternatively expose the housing cavity 34.

A pivot arm 42 is coupled to the housing 11. The pivot arm 42 has a proximal end 44 pivotably coupled within the pivot slot 30, a distal end 46, an arm top side 48, and an arm bottom side 50. The pivot arm 42 has a pivot pin 52 extending from the arm top side 48 proximal the proximal end 44 through the housing top side 16 to swingingly move the pivot arm 42 between a side position 54 extending perpendicularly from the housing left side 20 and an alternate front position 56 extending perpendicularly from the housing front side 12. The arm bottom side 50 of the pivot arm 42 has a channel 58.

A swing arm 60 is swingingly coupled to the arm bottom side 50 within the channel 58 to move between an engaged position 62 filling the channel 58 and an alternate released position 64 hanging below the pivot arm 42. An outer end 65 of the swing arm 60 extends past the distal end 46 of the pivot arm 42. An upper side 68 of the swing arm 60 has a line slot 66 adjacent the outer end 65. The line slot 66 is configured to secure a fishing line 67 of the fishing rod 28. The line slot 66 has a U-shaped profile. A line position pin 70 is coupled to the pivot arm 42. The line position pin 70 extends from the distal end 46 and is configured to position the fishing line 67 into the line slot 66. A plurality of magnets 72 is coupled to the arm bottom side 50. A ferrous strip 74 is coupled to the swing arm 60. The ferrous strip 74 is coupled to the upper side 68 and is selectively engageable with the plurality of magnets 72 to secure the swing arm 60 in the engaged position 62.

A switch sensor 76 is coupled to the pivot arm 42 and is in operational communication with the swing arm 60 to detect movement from the engaged position 62 to the released position 64. A buzzer 78 is coupled to the pivot arm 42 and is in operational communication with the switch sensor 76 to create an audial alarm when the switch sensor 76 is activated. The buzzer 78 is a piezo buzzer. A logic module 80 is coupled to the housing 11 within the housing cavity 34 and is in operational communication with the switch sensor 76 and the buzzer 78. A battery 81 is coupled to the housing 11 within the housing cavity 34 and is in operational communication with the switch sensor 76, the buzzer 78, and the logic module 80. A plurality of first LED lights 82 is coupled within the channel 58 and is in operational communication with the logic module 80 and the battery 81. The first LED lights 82 illuminate when the switch sensor 76 is activated. A plurality of second LED lights 84 is coupled to the housing bottom side 18. The second LED lights 84 are in operational communication with the logic module 80 and the battery 81. The second LED lights 84 may be arranged in a matrix. The second LED lights 84 illuminate when the switch sensor 76 is activated. A power switch 86 is coupled to the housing left side 20 and is in operational communication with the battery 81 and the logic module 80.

In use, the apparatus 10 is mounted to the wall 38 of an ice fishing house. The pivot arm 42 is moved to the front position 56 and the swing arm 60 is moved to the engaged position 62. The fishing line 67 is placed under the line position pin 70 and into the line slot 66 with the fishing line 67 held in the center of an ice hole 88 to prevent the fishing line 67 from freezing to the ice. When a fish bites the fishing line 67 pulls the swing arm 60 down to the released position 64, tripping the switch sensor 76 to activate the buzzer 78, the first plurality of LED lights 82, and the plurality of second LED lights 84 to alert the user and illuminate the area.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:
1. A fishing rod holder alert apparatus comprising:
a housing having a housing front side, a housing back side, a housing top side, a housing bottom side, a housing left side, and a housing right side, the housing top side having a rod aperture extending through the housing top side, the rod aperture being configured to secure a handle of a fishing rod, the housing front side and the housing left side having a pivot slot extending through a front left edge of the housing, the housing left side having a housing cavity extending towards the housing right side, the housing back side having a pair of mounting apertures, wherein the mounting apertures are configured to receive hardware to mount the housing to a wall of an ice fishing house without interfering with a position of the fishing rod when the handle of the fishing rod is inserted into the rod aperture;
a pivot arm coupled to the housing, the pivot arm having a proximal end pivotably coupled within the pivot slot, a distal end, an arm top side, and an arm bottom side, the pivot arm swingingly moving between a side position extending perpendicularly from the housing left side and an alternate front position extending perpendicularly from the housing front side;
a swing arm coupled to the pivot arm, the swing arm being swingingly coupled to the arm bottom side to move between an engaged position adjacent the pivot arm and an alternate released position hanging below the pivot arm, an outer end of the swing arm extending past the distal end of the pivot arm, an upper side of the swing arm having a line slot adjacent the outer end, the line slot being configured to secure a fishing line of the fishing rod;
a plurality of magnets coupled to the pivot arm, the plurality of magnets being coupled to the arm bottom side;

a ferrous strip coupled to the swing arm, the ferrous strip being coupled to the upper side and being selectively engageable with the plurality of magnets to secure the swing arm in the engaged position;

a switch sensor coupled to the pivot arm, the switch sensor being in operational communication with the swing arm to detect movement from the engaged position to the released position;

a buzzer coupled to the pivot arm, the buzzer being in operational communication with the switch sensor to create an audial alarm when the switch sensor is activated;

a logic module coupled to the housing, the logic module being coupled within the housing cavity and being in operational communication with the switch sensor and the buzzer; and a battery coupled to the housing, the battery being coupled within the housing cavity and being in operational communication with the switch sensor, the buzzer, and the logic module.

2. The fishing rod holder alert apparatus of claim 1 further comprising a line position pin coupled to the pivot arm, the line position pin extending from the distal end and being configured to position the fishing line into the line slot.

3. The fishing rod holder alert apparatus of claim 1 further comprising the arm bottom side of the pivot arm having a channel, the swing arm being coupled within the channel and filling the channel in the engaged position, the plurality of magnets being coupled within the channel.

4. The fishing rod holder alert apparatus of claim 3 further comprising a plurality of first LED lights coupled within the channel, the first LED lights being in operational communication with the logic module and the battery, the first LED lights illuminating when the switch sensor is activated.

5. The fishing rod holder alert apparatus of claim 1 further comprising a plurality of second LED lights coupled to the housing, the second LED lights being coupled to the housing bottom side, the second LED lights being in operational communication with the logic module and the battery, the second LED lights illuminating when the switch sensor is activated.

6. The fishing rod holder alert apparatus of claim 1 further comprising a power switch coupled to the housing, the power switch being coupled to the housing left side and being in operational communication with the battery and the logic module.

7. The fishing rod holder alert apparatus of claim 1 further comprising a cover coupled to the housing, the cover being selectively engageable with the housing left side to cover and alternatively expose the housing cavity.

8. The fishing rod holder alert apparatus of claim 1 further comprising the pivot arm having a pivot pin extending from the arm top side proximal the proximal end through the housing top side.

9. The fishing rod holder alert apparatus of claim 1 further comprising the rod aperture extending through the housing top side at an angle of 45° relative to each of the housing top side and the housing front side.

10. A fishing rod holder alert apparatus comprising:

a housing having a housing front side, a housing back side, a housing top side, a housing bottom side, a housing left side, and a housing right side, the housing top side having a rod aperture extending through the housing top side at an angle of 45° relative to each of the housing top side and the housing front side, the rod aperture being configured to secure a handle of a fishing rod, the housing front side and the housing left side having a pivot slot extending through a front left edge of the housing, the housing left side having a housing cavity extending towards the housing right side, the housing back side having a pair of mounting apertures, wherein the mounting apertures are configured to receive hardware to mount the housing to a wall of an ice fishing house without interfering with a position of the fishing rod when the handle of the fishing rod is inserted into the rod aperture;

a cover coupled to the housing, the cover being selectively engageable with the housing left side to cover and alternatively expose the housing cavity;

a pivot arm coupled to the housing, the pivot arm having a proximal end pivotably coupled within the pivot slot, a distal end, an arm top side, and an arm bottom side, the pivot arm having a pivot pin extending from the arm top side proximal the proximal end through the housing top side to swingingly move the pivot arm between a side position extending perpendicularly from the housing left side and an alternate front position extending perpendicularly from the housing front side, the arm bottom side of the pivot arm having a channel;

a swing arm coupled to the pivot arm, the swing arm being swingingly coupled to the arm bottom side within the channel to move between an engaged position filling the channel and an alternate released position hanging below the pivot arm, an outer end of the swing arm extending past the distal end of the pivot arm, an upper side of the swing arm having a line slot adjacent the outer end, the line slot being configured to secure a fishing line of the fishing rod;

a line position pin coupled to the pivot arm, the line position pin extending from the distal end and being configured to position the fishing line into the line slot;

a plurality of magnets coupled to the pivot arm, the plurality of magnets being coupled to the arm bottom side;

a ferrous strip coupled to the swing arm, the ferrous strip being coupled to the upper side and being selectively engageable with the plurality of magnets to secure the swing arm in the engaged position;

a switch sensor coupled to the pivot arm, the switch sensor being in operational communication with the swing arm to detect movement from the engaged position to the released position;

a buzzer coupled to the pivot arm, the buzzer being in operational communication with the switch sensor to create an audial alarm when the switch sensor is activated;

a logic module coupled to the housing, the logic module being coupled within the housing cavity and being in operational communication with the switch sensor and the buzzer;

a battery coupled to the housing, the battery being coupled within the housing cavity and being in operational communication with the switch sensor, the buzzer, and the logic module;

a plurality of first LED lights coupled within the channel, the first LED lights being in operational communication with the logic module and the battery, the first LED lights illuminating when the switch sensor is activated;

a plurality of second lights coupled to the housing, the second LED lights being coupled to the housing bottom side, the second LED lights being in operational communication with the logic module and the battery, the second LED lights illuminating when the switch sensor is activated; and a power switch coupled to the housing, the power switch being coupled to the housing left side and being in operational communication with the battery and the logic module.

\* \* \* \* \*